Dec. 20, 1938.    J. G. McLAIN    2,140,963
AUXILIARY CUTTER FOR LAWN MOWERS
Filed Nov. 27, 1937
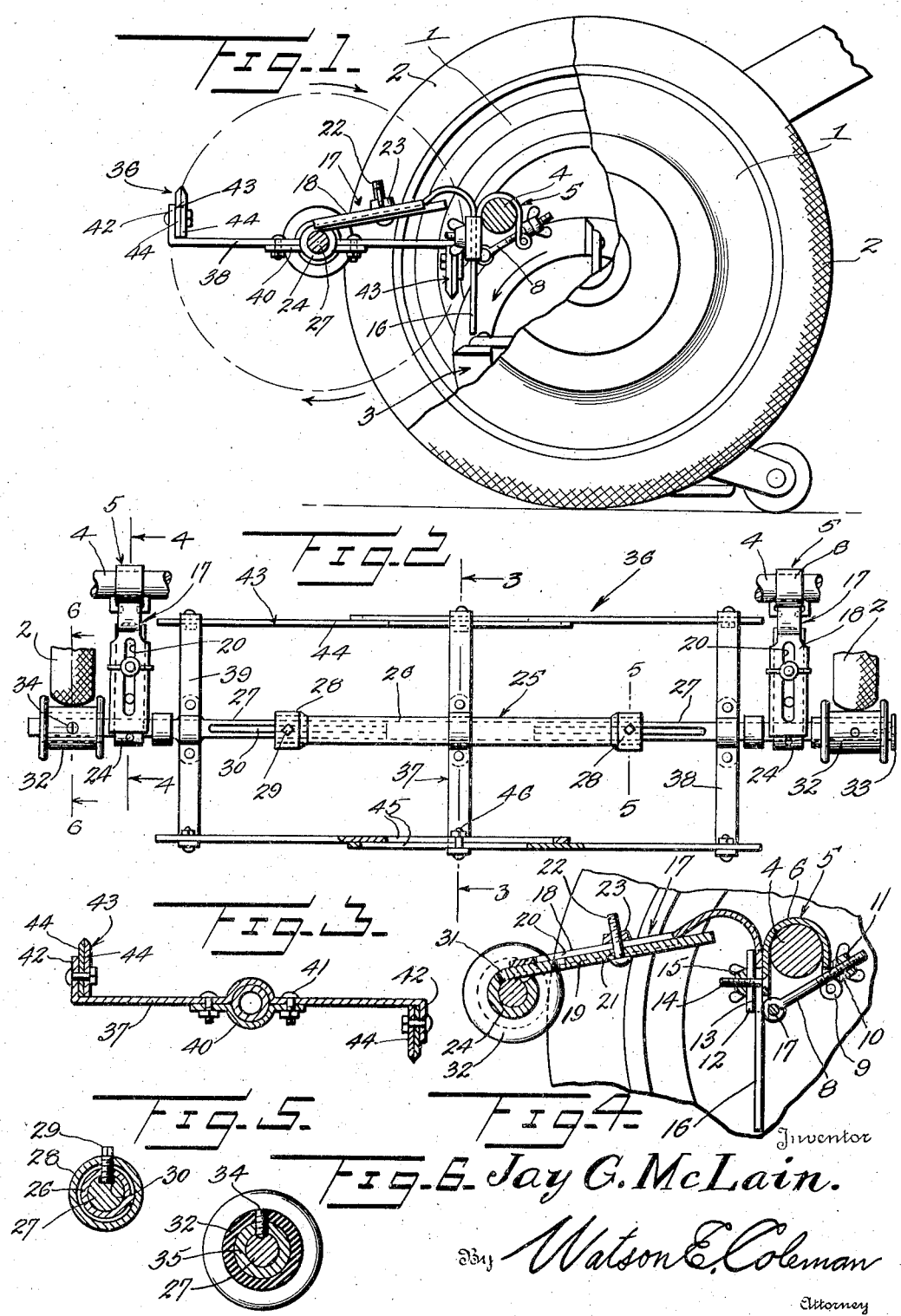
Inventor
Jay G. McLain.
By Watson E. Coleman
Attorney Patented Dec. 20, 1938

2,140,963

UNITED STATES PATENT OFFICE 2,140,963

AUXILIARY CUTTER FOR LAWN MOWERS

Jay G. McLain, Steubenville, Ohio

Application November 27, 1937, Serial No. 176,855

6 Claims. (Cl. 56—238)

This invention relates to the class of mowing machines and pertains particularly to lawn mowers.

The present invention has for its primary object to provide an improved attachment for lawn mowers whereby tall grass and weeds which cannot be cut by the lawn mower blades, may be conveniently cut off at such a height as to permit the regular blades of the mower to sever them close to the ground.

Another object of the invention is to provide an auxiliary cutter for lawn mowers which is of novel construction in that it may be readily adjusted for length and as regards its position forwardly of the regular cutters of the mower so as to be applicable to different sizes of mowers.

Another object of the invention is to provide an auxiliary grass and weed cutter for lawn mowers wherein novel means is provided for taking driving power from the regular ground engaging wheels of the lawn mower to rotate a cutting reel which forms a part of the auxiliary cutter.

The invention will be best understood from a consideration of the following detailed description taken in connection with the accompanying drawing forming part of this specification, with the understanding, however, that the invention is not confined to any strict conformity with the showing of the drawing but may be changed or modified so long as such changes or modifications mark no material departure from the salient features of the invention as expressed in the appended claims.

In the drawing:

Figure 1 is a view partly in side elevation of a conventional type of lawn mower showing the auxiliary cutter embodying the present invention applied thereto and in transverse section.

Fig. 2 is a view in top plan of the mower cutter attachment.

Fig. 3 is a sectional view on the line 3—3 of Fig. 2.

Fig. 4 is a sectional view on the line 4—4 of Fig. 2.

Fig. 5 is a sectional view on the line 5—5 of Fig. 2.

Fig. 6 is a sectional view on the line 6—6 of Fig. 2.

Referring now more particularly to the drawing, there is illustrated in Fig. 1 a portion of a conventional type of lawn mower wherein the ground engaging wheels are each indicated by the numeral 1 and each of these wheels is shown with a rubber tire 2 by which traction is obtained for rotating the cutter 3 thru the medium of the usual well known mechanism, not shown. As is well known, all lawn mowers of the type herein illustrated are provided with a brace bar 4 which extends across the mower between the portions of the frame which are adjacent the wheels 1 and this bar is normally set slightly forwardly and a little above the rotary cutter blades 3.

The device embodying the present invention is supported from the brace bar 4 and comprises two clamp units 5, each of which is secured to the brace bar adjacent an end thereof. Each of these clamp units consists of a band of metal 6 which is bent over the bar 4 as illustrated in Fig. 4, and one end of this band has oscillatably secured thereto, through the medium of the transverse pin 7 the bolt 8. The other end of the band is slotted, as indicated at 9, to receive the threaded end of the bolt 8 and this threaded end of the bolt receives a washer 10 and a thumb nut or screw 11. When the clamp is engaged over the bar 4 in the manner illustrated, the threaded end of the bolt is swung up into the slot 9 and the thumb screw is threaded inwardly so as to force the washer 10 against the slotted end of the band and thus pull the ends together so as to grip the brace bar.

The clamp units 5 are mounted on the brace bar 4 so that the free ends hang vertically and the forward end of the band of each unit has formed integral with its side edges the inturned flanges 12 which are in edge-opposed relation and spaced from the band so as to form guide slots 13. This forward end of each band 6 also has a bolt 14 mounted therein and extending forwardly between the flanges 12 to receive the thumb screw 15 which straddles the space between the flanges so as to spring the latter inwardly for the purpose of holding in place the vertically disposed and longitudinally slotted end 16 of a bracket, which is indicated generally by the numeral 17. Each of these brackets consists of an arm which is made up of the two sections 18 and 19. These sections are disposed in longitudinal relation one upon the other and the upper section of the arm is longitudinally slotted as indicated at 20, while the lower section has a pair of bolt openings 21 therethru in one of which openings a bolt 22 engages and extends upwardly through the slot 20 to receive the thumb screw 23 whereby the two sections of the arm are adjustably secured together. One of the sections of each arm, the section or portion 19, has its forward end rolled or formed to provide a bearing sleeve 24, and these sleeves are in alinement across the front of the lawn mower to receive the ends of a shaft which is indicated as a whole by the numeral 25.

The shaft 25 is made up of three sections, a central section 26 and the outer sections 27, and the central section is preferably of tubular formation having a collar 28 threadably secured upon each end and receiving in each end one end of an outer section 27 which is secured therein by the set screw 29 which is threaded through the adjacent collar for engagement in the longitudinal groove 30 of the inserted outer section of the shaft. These outer sections are extended through the bearings 24 and each bearing is provided with an oil hole 31 by which a lubricant may be conveniently introduced between the shaft and the bearing surface.

Each outer section 27 of the shaft, outwardly of the bearing 24, in which it is mounted, carries a spool 32. These spools constitute friction wheels which engage against the periphery of the adjacent tire 2 of the traction wheel of the mower. It is preferred that one of these spools be free to rotate upon its end of the shaft while the other is fixedly secured to the shaft so that power is transferred to the shaft from the traction wheel at one side only of the mower. As shown in Fig. 2, the spool 32 at the right of the machine is retained in place upon the end of the shaft by a collar 33 so that this spool may be rotated freely without coming off of the shaft, while the other spool is held on the shaft by the securing screw 34 which is passed therethrough and into the shaft as illustrated in detail in Fig. 6. It is also preferred that each of these spools 32 be of rubber mounted upon an inner carrying sleeve 35 so that the maximum of frictional contact may be obtained between the power receiving spool and the adjacent tire.

The numeral 36 generally designates a cutting reel and this reel comprises the three arms 37, 38 and 39 which extend across the shaft 25, the arm 37 being at the transverse center of the shaft and secured to the portion 26 while the arms 38 and 39 are secured across the portions 27 and adjacent the brackets 17. Any suitable means may be provided for securing these arms to the respective portions of the shaft, the means here shown consisting of a clamp plate 40 which is disposed longitudinally of each arm and attached thereto at opposite sides of the shaft by the bolts 41. The outer ends of the arms are turned in opposite directions, as indicated at 42, and all of the ends on one side of the shaft are directed in one direction, while those at the opposite side of the shaft extend in the opposite direction. These oppositely turned ends of the arms have secured thereto cutter blades 43 and each blade is formed in two sections, each of which is indicated by the numeral 44, which sections are in overlapping relation across the turned ends of the central arm 37, and these overlapping portions of the blades are longitudinally slotted, as indicated at 45, so that the securing bolts 46 which pass thru the turned ends of the arm 37 may be employed for holding the overlapping ends of the blade sections in adjusted relation.

From the foregoing it will be readily apparent that when the auxiliary cutter embodying the present invention is mounted by the clamp units 5 upon the brace bar 4 of the mower, the brackets 17 project forwardly and downwardly so that the traction spools 32 will rest against the tires of the wheels 1. The portion 18 of each bracket arm is of resilient metal so that the angled part connecting it with the vertical portion 16 will have a springiness which will permit the shaft 24 and the reel carried thereby to move slightly relatively to the wheels 1 and the weight of the reel will thus keep the spools 32 in frictional contact with the tires of the traction wheels. Thus as the mower is moved forwardly the reel 36 will be rotated in a counterclockwise direction as opposed to the clockwise rotation of the cutter unit 3 and the blades 43 will cut off the tall grass so as to reduce the height thereof sufficiently for the regular cutter blades 3 to cut the same in the same manner as they do the shorter grass. By this means tall weeds and grass such as wire grass, plantain and dandelion may be kept cut down and thus preventing their flowering and seeding and in this manner lawns may be conveniently kept free of these undesirable plants. By making the supporting brackets 17 and the reel 36 adjustable, it will be readily seen that the auxiliary cutter may be made up in one size and may be made to fit different sizes of mowers.

I claim:

1. In a grass cutting machine having a pair of spaced ground engaging wheels, a frame supported by said wheels, cutters operating between the wheels and a brace bar extending longitudinally of the cutters between the wheels, an auxiliary cutter structure comprising a pair of clamping units each comprising a band looped over the brace bar adjacent one end of the bar, means coupling the ends of the band to draw the loop into binding engagement with the bar, a guide forming a part of each band, a pair of arms each having an angular terminal slidably engaged in said guide and adjustably secured thereto, each arm being extended forwardly with respect to the machine cutters, a bearing carried by each arm, a shaft extending between said arms and thru said bearings, a plurality of arms extending radially from said shaft and forming two series, the arms of each series being spaced longitudinally of the shaft, a cutter blade extending across and connecting the ends of the arms of each series, and a friction wheel carried on each end of the shaft and frictionally engaging the periphery of a wheel to be rotated thereby.

2. In a grass cutting machine having a pair of ground engaging wheels, a frame supported thereby, cutters operating between the wheels and a brace bar extending across the machine between the wheels, a pair of bracket members each comprising two substantially rightangularly related portions, a pair of clamp members each adapted to be secured to the brace bar adjacent one end of the latter, means for adjustably securing a portion of each bracket to a clamp member whereby the other portion of the bracket will extend forward with respect to said cutters, said forwarding extending portions of the brackets consisting of two members secured for longitudinal adjustment, a bearing carried at the forward end of each of said members, a shaft extending across the machine having each of its ends rotatably supported in a bearing, said shaft consisting of a central tubular portion and two outer portions, each of said outer portions having an end slidably secured in an end of the tubular portion, a wheel carried by the outer end of each outer portion and having frictional engagement with the periphery of a ground engaging wheel of the machine, and a cutter reel supported by said shaft and comprising a pair of cutter blades extending in parallel relation with the shaft, each of said blades being in two longitudinally adjustable parts, and said blades at their outer ends being coupled with the outer portions of said shaft whereby the length of the blades and of the shaft may be varied.

3. In a grass cutting machine having a pair of spaced ground engaging wheels, a frame supported thereby, cutters operating between the wheels and a brace bar extending across the machine between the wheels, a pair of bracket members each having two substantially rightangularly related portions, means for securing a portion of each bracket member vertically to said brace bar whereby the other portion will extend forwardly thereof, a bearing carried at the forward end of the said other portion of each bracket, each of said brackets being resiliently made at the point of joinder between the two portions thereof to permit relative movement between the portions, a shaft extending transversely of the machine and having its ends rotatably supported in said bearings, a cutting reel carried by said shaft, and friction wheels mounted upon the ends of the shaft and having frictional engagement with the adjacent ground engaging wheels, said resilient portions of said brackets facilitating yieldable contact between said friction wheels and said ground wheels.

4. In a grass cutting machine having a pair of ground engaging wheels, a frame supported thereby, cutters operating between the wheels and a brace bar extending across the machine between the wheels; a pair of bracket members each comprising two substantially right angularly related portions, a pair of clamp members each adapted to be secured to the brace bar adjacent one end of the latter, means for adjustably securing a portion of each bracket to a clamp member whereby the other portion of the bracket will extend forward with respect to said cutters, said forward extending portions of the brackets consisting of two members secured for longitudinal adjustment, a bearing carried at the forward end of each of said members, a shaft extending across the machine having each of its ends rotatably supported in a bearing, said shaft consisting of a central tubular portion and two outer portions, each of said outer portions having an end slidably secured in an end of the tubular portion, a wheel carried by the outer end of each outer portion and having frictional engagement with the periphery of a ground engaging wheel of the machine, and a cutter reel supported by said shaft and formed in sections joined for relative adjustment longitudinally of said shaft to facilitate the changing of its length for the proper disposition of said shaft carried wheels in frictional engagement with the said ground engaging wheels.

5. A tall grass cutter attachment for a lawn mower having a pair of ground engaging wheels, a frame supported thereby, cutters operating between the wheels and a brace bar extending across the machine between the wheels; comprising a cutter reel consisting of a shaft, a plurality of arms extending radially from the shaft, a plurality of blades carried by said arms and extending in parallel relation with one another and with the shaft and a friction wheel carried at each end of said shaft for engagement with said ground engaging wheels and supporting means for said reel structure, comprising a pair of units each having two substantially right angularly related portions, a reel shaft engaging bearing at the free end of one of said portions, means for securing the other of said portions to said brace bar, and each of said units at the point of joinder of said portions having an inherent resiliency yieldable under the weight of the supported reel to permit contact of said friction roller with the adjacent ground engaging wheel.

6. An improved grass cutting reel for attachment to a lawn mower, including means for mounting the reel upon the mower, comprising a shaft having a central portion and two end portions, said central portion being tubular at its ends to receive in each end an end of an outer portion, means for securing the outer and central portions of the shaft in adjusted relation, a plurality of arms carried by and extending radially from said central portion, a plurality of arms carried by and extending radially from each of said outer portions, a plurality of two-part cutting blades, each connecting together the free ends of arms carried by the central and outer portions of the shaft, each of said blades having the two parts thereof in sliding overlapping relation and detachably secured to the adjacent radial arm extending from the central portion, and friction wheels carried at the outer ends of the outer portions of the shaft for contact with supporting wheels of the said mower.

JAY G. McLAIN.